J. POLASEK.
SWEEP STOCK ATTACHMENT.
APPLICATION FILED MAR. 15, 1916.
1,230,022.
Patented June 12, 1917.
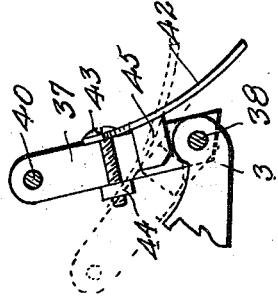
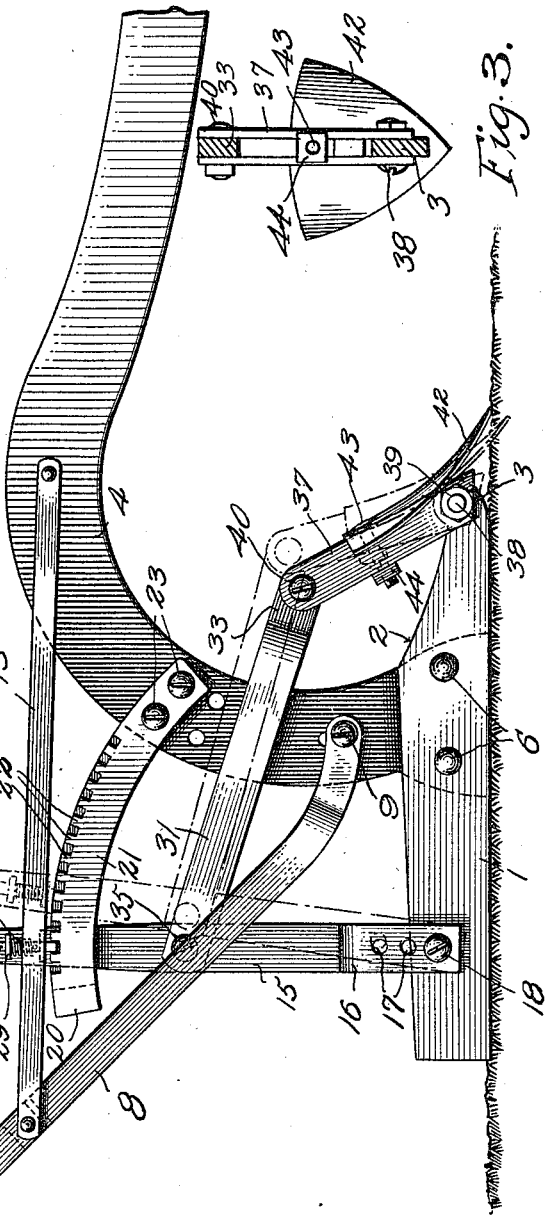
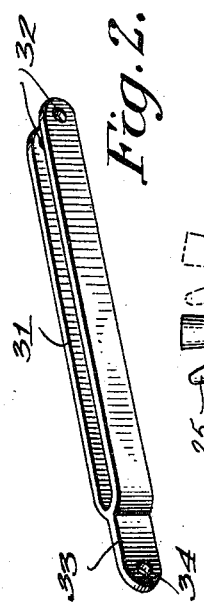
Witnesses
Inventor:
John Polasek
his Attys.

UNITED STATES PATENT OFFICE.

JOHN POLASEK, OF CALDWELL, TEXAS.

SWEEP-STOCK ATTACHMENT.

1,230,022.  Specification of Letters Patent.  Patented June 12, 1917.

Application filed March 15, 1916. Serial No. 84,488.

*To all whom it may concern:*

Be it known that I, JOHN POLASEK, a citizen of the United States of America, residing at Caldwell, in the county of Burleson and State of Texas, have invented certain new and useful Improvements in a Sweep-Stock Attachment, of which the following is a specification, reference being had therein to the accompanying drawing.

This invention relates to a sweep stock attachment for plows and has for its principal object the production of a device which is so constructed as to permit the angle of the plow point to be changed, thereby causing the plow point to dig into the ground to a great or less depth as desired.

Another object of this invention is the production of a sweep stock attachment for plows wherein a lever is provided adjacent the handles of the plow, which lever is connected to the plow point in such a manner as to permit the plow point to be shifted so as to change the angle in which the same is extending when it is desired to cause the plow point to dig into the ground to another desired depth.

Another object of this invention is the production of a sweep stock attachment for plows wherein a link pivotally connects the lever to the plow point standards so that as the lever is adjusted the plow point standards may be swung forwardly or rearwardly, thereby causing the plow points carried by these standards to assume different angles for causing the same to dig into the ground to a desired depth when in use.

A still further object of this invention is the production of a sweep stock attachment for plows wherein the standards of the plow points are carried in spaced relation so as to permit the securing means of the plow points to fit therebetween, thus retaining the plow points in an adjusted position upon the standards.

With these and other objects in view this invention consists of certain novel combinations, constructions, and arrangements of parts as will be hereinafter fully described and claimed.

In the accompanying drawings:

Figure 1 is a side elevation of the sweep stock attachment.

Fig. 2 is a detail perspective view of the link.

Fig. 3 is a rear elevation of the standards and plow point.

Fig. 4 is a side elevation of the device disclosed in Fig. 3, one of the standards being removed.

Referring to the accompanying drawings by numerals it will be seen that the sweep stock attachment comprises a land bar 1 which tapers at its forward end as indicated at 2 so as to provide the head 3. The curved plow beam 4 has its lower end fitting upon one side of the land bar 1. The bolts 6 are passed through the land bar 1 and the beam 4 so as to permanently secure the plow beam 4 upon the land bar 1. The handles 8, one only thereof being disclosed, have their lower ends secured by means of a bolt 9 to the plow beam 4 adjacent its lower end, as shown in Fig. 2, although the handles 8 extend upwardly. A longitudinal brace 13 extends from each side of the plow beam 4 and is retained at its forward end by means of the rivet 14 which pass therethrough and also through the beam. The rear end of each longitudinal brace 13 is carried upon a rivet 11 whereby the handles will be positively retained in their normal correct position by means of the braces 13.

The operating lever 15 has a bifurcated lower end 16 fitting over the land bar 1 adjacent its rear end. It will be noted that the bifurcated end 16 of the lever 15 is provided with a plurality of registering apertures 17 for the purpose of permitting the height of the lever 15 to be adjusted. After being positioned upon the land bar 1 the bolt 18 is passed through selected apertures 17 and also through the land bar 1 so as to carry the nut 19 for permanently although pivotally supporting the lever 15 upon the land bar. The rack 20 has a plurality of teeth 22. This rack 20 embraces the side portions of the plow beam 4 and has the bolts 23 passing therethrough and also through the plow beam 4 for fixedly securing the rack 20 in a set position upon the plow beam 4. This rack 20 is arranged in such a position as to permit the lever 15 to pass upwardly thereadjacent and because of its length it will permit the lever to be rocked back and forth as desired.

The latch handle 25 is pivotally secured upon the rivet 26 carried by the lever 15 and from this latch handle 25 there extends a stem 27 which in turn is connected to the plunger 28. The plunger 28 extends through a pair of plates 29 and has a spring 30 positioned thereon so as to normally urge the plunger downwardly. This plunger is adapted to engage the teeth 22 formed upon the rack 20 for holding the lever in an adjusted set position. Of course, when so desired, the latch handle 25 may be swung toward the upper end of the lever 15 thus causing the stem 27 to raise the plunger 28 from engagement with the teeth 22. This action will permit the lever to be moved to a desired position along the rack, although upon the releasing of the latch handle 25 it will be seen that the plunger will be moved into engagement with the teeth 22, thus holding the lever in an adjusted set position.

The link comprises a pair of parallel elongated side members 31 having alined openings 32 in their rear ends. The forward ends of the side members 31, however, are brought together and welded to provide the forwardly extending tongue 33 in which there is formed an opening 34. The side members 31 of this link pass upon each side of the plow beam 4 and have their rear ends embracing the side portion of the lever 15. The bolt 35 passes through the openings 32 and through the lever 15 for pivotally securing the lever to the yoke.

The plow point standards 37 have their lower ends positioned upon each side of the head 3 so as to permit the bolt 38 to be passed therethrough and carry a nut 39, thereby positively holding the lower ends of the plow point standards in pivotal engagement with the land bar 1. The tongue 33 of the link passes between the upper ends of the standards 37 whereby the bolt 40 may be passed through the upper end of the standards 37 and through the opening 34 formed in the tongue 33 for pivotally connecting the plow points standards 37 and the link.

The plow point 42 has a retaining bolt 43 passing rearwardly therethrough and this bolt 43 passes between the parallel spaced plow point standards 37 so as to carry the binding nut 44, whereby the plow point 42 will be held in an adjusted vertical position upon the plow point standards 37. It will be noted, however, by referring to Fig. 4 particularly that there is formed an integral lug 45 upon the rear surface of the plow point 42. This lug 45 fits between the standards 37 and as a consequence will hold the plow point 42 against any possibility of side movement upon the bolt 43. Thus, it will be seen that when so desired, by the loosening of the clamping nut 44 the plow point 42 may be moved either upwardly or downwardly along the plow point standards 37, since the bolt and lug 45 will constitute a guide for the plow point.

When this sweep stock attachment is in use any suitable means may be employed for propelling the same or drawing the same forwardly. As the land bar 1 is drawn over the surface of the ground the plow point 42 will dig into the ground for forming a furrow or turning over the earth through which it passes. If so desired, as above stated, the plow point 42 may move to a lower position and retained in this adjusted position by means of the bolt and nut 43 and 44, respectively so as to extend for a considerable distance below the lower plane of the land bar 1. If it is desired to further cause the plow points to dig into the ground to a greater depth the latch handle 25 may be swung for causing the plunger 28 to release the rack, at which time the lever 15 may be swung forwardly at its upper end. This action of the lever will cause the link to be moved forwardly and because of the fact that the tongue 33 is connected to the plow point standards it will be seen that these standards will be swung toward a vertical position for causing the plow point to move nearer a vertical plane and thus dig into the ground as the plow is moved forwardly, as indicated very clearly in dotted lines in Fig. 1. When it is desired, however, to move the plow over the ground without causing the plow point to dig thereinto the lever 15 may be swung to the rear end of the rack 20, which action will cause the link to draw upon the upper ends of the plow point standards 37, thereby swinging the plow point 42 upwardly for preventing the same from digging into the ground as shown in Fig. 1. It will be noted, however, by referring to the dotted lines in Fig. 4 that when the standards 37 are swung rearwardly at their upper ends the lug 45 which always keeps the plow point 42 from having side pivotal movement upon the bolt 43 will be swung into engagement with the tapering end 2 of the land bar 1 for assisting in resisting the rearward movement of the standards, thus relieving considerable of the strain and shock from the rear end of the rack 20 when the plunger 28 engages the same.

From the foregoing description it will be seen that a very simple and efficient sweep stock attachment has been constructed which is formed substantially of a number of straight bars, thus eliminating very expensive casting, which would increase the cost of manufacturing the device, and which is formed so as to permit the operator to remain in his normal position walking behind the plow, to easily adjust the angle to which the plow point 42 extends. It will be seen that by simply swinging the lever the link will cause the standards to be swung so as to move the plow point for causing the plow point to dig into the ground to as great a depth as desired or cause the same to be swung so as to be moved almost, or entirely, from engagement with the ground, and thus prevent the device from digging or operating when it is simply desired to move the same over an even surface.

What is claimed is:

1. In a device of the class described, the combination of a land bar, a plow beam fixedly secured to said land bar, a lever pivotally and adjustably mounted upon said land bar, plow point supporting standards pivotally mounted upon said land bar, a link connecting said lever to said plow point supporting standards, and a plow point adjustably mounted upon said standards, whereby upon the movement of said lever said standards may be moved so as to adjust said plow point when desired.

2. In a device of the class described, the combination of a land bar, a plow beam fixedly secured to said land bar intermediate its ends, a lever pivotally mounted upon said land bar adjacent its rear end, means for retaining said lever in an adjusted set position, plow point supporting standards pivotally mounted upon said land bar adjacent its forward end, a link connecting said lever to said plow point supporting standards, a plow point carried upon said standards, said lever being adapted to be moved by the operator walking behind the device when the same is in operation, whereby the link will swing said standards so as to move said plow point for adjusting the depth to which the same may dig into the ground when in use.

3. In a device of the class described, the combination of a land bar, a lever having a bifurcated lower end fitting upon said land bar, means for holding said bifurcated end in an adjusted position thereon, means for holding said lever against pivotal movement after the same has been moved to a set position, a link comprising parallel side members clamping upon each side of said plow beam and embracing the sides of said lever, means for holding said link in engagement with said lever, plow point supporting standards pivotally mounted upon said land bar adjacent its forward end, the forward ends of said members being welded together to form a forwardly extending tongue fitting between the upper ends of said standards, means for pivotally connecting said standards to said tongue, and a plow point carried upon said standards whereby upon the swinging of said lever said link will swing said plow point supporting standards so as to move said plow point for predetermining the depth to which the plow point will dig when in use.

4. In a device of the class described, the combination of a land bar having a plow beam and handles mounted thereon, a lever pivotally mounted upon said land bar, means for releasably retaining said lever in adjusted set position, a link pivotally secured to said lever, a pair of parallel plow point supporting standards pivotally connected to the forward end of said land bar, said link fitting between the upper ends of said standards and being pivotally secured thereto, and a plow point adjustably mounted upon said standards, whereby upon the swinging of said lever said link will swing said standards so as to move said plow point, whereby said plow point will be caused to dig into the ground at a great depth or may be swung so as to prevent the same from digging into the ground when not so desired.

5. In a device of the class described, the combination of a land bar having a plow beam and handles mounted thereon, a lever pivotally mounted upon said land bar, means for releasably retaining said lever in an adjusted set position, a link pivotally secured to said lever, a pair of parallel plow point supporting standards pivotally connected to the forward end of said land bar, said link fitting between the upper ends of said standards and being pivotally secured thereto, a plow point fitting upon the forward portions of said standards, a bolt carried by said plow point passing through said standards, a nut carried by said bolt, whereby said plow point will be held in an adjusted set position upon said standards, a lug formed upon the rear portions of said plow point and extending between said standards, whereby said plow point will be held against side movement when in use, and said lever being adapted to be swung so as to cause said link to move said standards whereby the plow point will be moved so as to extend in a different angle for causing the same to dig into the ground to a great or less depth as desired.

In testimony whereof I hereunto affix my signature.

JOHN POLASEK.